United States Patent
Ishii (10) Patent No.: US 10,468,710 B2
(45) Date of Patent: Nov. 5, 2019

(54) NONAQUEOUS SECONDARY BATTERY (71) Applicant: TOYOTA JIDOSHA KABUSHIKI KAISHA, Toyota-shi, Aichi (JP)

(72) Inventor: Kenta Ishii, Seto (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 75 days.

(21) Appl. No.: 15/911,985

(22) Filed: Mar. 5, 2018

(65) Prior Publication Data
US 2018/0254506 A1 Sep. 6, 2018

(30) Foreign Application Priority Data

Mar. 6, 2017 (JP) ................. 2017-042031

(51) Int. Cl.
H01M 4/62 (2006.01)
H01M 10/04 (2006.01)
H01M 10/0565 (2010.01)
H01M 10/052 (2010.01)
H01M 10/0568 (2010.01)

(52) U.S. Cl.
CPC ....... H01M 10/0431 (2013.01); H01M 4/622 (2013.01); H01M 4/623 (2013.01); H01M 10/052 (2013.01); H01M 10/0565 (2013.01); H01M 10/0568 (2013.01); Y02E 60/122 (2013.01); Y02T 10/7011 (2013.01)

(58) Field of Classification Search
CPC .. H01M 10/0431; H01M 4/623; H01M 4/622; H01M 10/0568; H01M 10/052; H01M 10/0565; Y02E 60/122; Y02T 10/7011
See application file for complete search history.

(56) References Cited

U.S. PATENT DOCUMENTS

2015/0017533 A1    1/2015   Takahashi et al.

FOREIGN PATENT DOCUMENTS

| JP | 11-154508 A | 6/1999 | |
| JP | 2016-170992 A | 9/2016 | |
| WO | 2013/114849 A1 | 8/2013 | |
| WO | WO-2015/133154 | * 11/2015 | .......... H01M 4/1395 |

OTHER PUBLICATIONS

Machine translation of WO 2015/133154, retrieved from <www.espace.net> on Jul. 17, 2019.*

* cited by examiner

Primary Examiner — Cynthia K Walls
(74) Attorney, Agent, or Firm — Sughrue Mion, PLLC (57) ABSTRACT The present invention provides a nonaqueous secondary battery having a positive electrode, a negative electrode, and a nonaqueous electrolyte solution. The nonaqueous electrolyte solution contains a nonaqueous solvent and a supporting salt. The nonaqueous solvent contains N,N-dimethylformamide. The concentration of the supporting salt is 1 mol/L to 2 mol/L. At least one of the positive electrode and the negative electrode is provided with a collector, and an electrode mixture layer that is fixed to the collector and contains an active material and a binder. The binder contains a network polymer compound with a structure resulting from urethane-bonding of four-branch prepolymers having a polyethylene glycol backbone.

5 Claims, 2 Drawing Sheets

NONAQUEOUS SECONDARY BATTERY

CROSS REFERENCE TO RELATED APPLICATIONS

The present application claims priority based on Japanese Patent Application No. 2017-042031 filed on Mar. 6, 2017, the entire contents of which are incorporated herein by reference.

BACKGROUND OF THE INVENTION

1. Field of the Invention

The present invention relates to a nonaqueous secondary battery.

2. Description of the Related Art

Further enhancement of the performance of nonaqueous secondary batteries such as lithium ion secondary batteries is the object of ongoing study. As instances of relevant prior art, Japanese Patent Application Publication No. H11-154508 discloses the feature of using a nonaqueous solvent such as N,N-dimethylformamide (DMF) in a nonaqueous electrolyte solution. The nonaqueous solvents such as DMF described in paragraph [0015] of the above citation have high ionic conductivity. Accordingly, such nonaqueous solvents are useful for instance in terms of enhancing charge and discharge capacity.

SUMMARY OF THE INVENTION

However, studies by the inventors have revealed that DMF has high electron withdrawing properties and that binder components (for instance, polyvinylidene fluoride) present in the electrodes become dissolved in DMF. This has been problematic in that the shape of the electrode fails then to be maintained stably, and battery performance is impaired.

It is an object of the present invention, arrived at in the light of the above considerations, to provide a nonaqueous secondary battery of enhanced battery performance and that contains DMF in a nonaqueous electrolyte solution.

The present invention provides a nonaqueous secondary battery having a positive electrode, a negative electrode, and a nonaqueous electrolyte solution. The nonaqueous electrolyte solution contains a nonaqueous solvent and a supporting salt. The nonaqueous solvent contains N,N-dimethylformamide. A concentration of the supporting salt is 1 mol/L to 2 mol/L. At least one of the positive electrode and the negative electrode is provided with a collector, and an electrode mixture layer that is fixed to the collector and contains an active material and a binder. The binder contains a network polymer compound with a structure resulting from urethane-bonding of four-branch prepolymers having a polyethylene glycol backbone.

Conductivity can be increased by virtue of the fact that the nonaqueous electrolyte solution contains N,N-dimethylformamide (DMF). Moreover, thanks to the binder in the electrode mixture layer, dissolution of the binder by DMF is suppressed, whereby the shape of the electrode can be maintained stably. Further, liquid retention is increased in the electrode that contains the binder. As a result, it becomes possible to maintain the nonaqueous electrolyte solution suitably in the electrode mixture layer, also in cases for instance of high-rate charging and discharging in which the nonaqueous electrolyte solution is readily pushed out of the electrode mixture layer. Together, these effects allow keeping battery resistance low, while increasing high-rate tolerance, in the nonaqueous secondary battery.

Japanese Patent Application Publication No. 2016-170992 discloses a nonaqueous gel electrolyte in which polymers having a polyethylene glycol backbone are crosslinked, by amide bonds or the like, to configure a network structure, and discloses a nonaqueous secondary battery provided with this nonaqueous gel electrolyte. However, Japanese Patent Application Publication No. 2016-170992 does not disclose or suggest at all the feature of incorporating such a polymer compound, as a binder, into an electrode mixture layer. Further, Japanese Patent Application Publication No. 2016-170992 does not disclose or suggest at all a polymer compound resulting from crosslinking of the above four-branch prepolymers by way of urethane bonds.

In one preferred embodiment, the above polymer compound has a structure resulting from urethane-bonding of two types of prepolymers represented by chemical formulas (I) and (II):

[C1]

(I)

(in chemical formula (I), $n_{11}$ to $n_{14}$ are each independently an integer equal to or greater than 3, and $R^{11}$ to $R^{14}$ are each independently a linear or branched C1 to C7 alkylene group, a linear or branched C2 to C7 alkenylene group, —NH—$R^{15}$—, —CO—$R^{15}$—, —$R^{16}$—O—$R^{17}$—, —$R^{16}$—NH—$R^{17}$—, —$R^{16}$—C(O)O—$R^{17}$—, —$R^{16}$—C(=O)O—NH—$R^{17}$—, —$R^{16}$—CO—$R^{17}$— or —$R^{16}$—CO—NH—$R^{17}$—, where $R^{15}$ represents a linear or branched C1 to C7 alkylene group, $R^{16}$ represents a linear or branched C1 to C3 alkylene group and $R^{17}$ represents a linear or branched C1 to C5 alkylene group);

[C2]

(in chemical formula (II), $n_{21}$ to $n_{24}$ are each independently an integer equal to or greater than 3, and $R^{21}$ to $R^{24}$ are each independently a linear or branched C1 to C7 alkylene group, a linear or branched C2 to C7 alkenylene group, —NH—$R^{15}$—, —CO—$R^{15}$—, —$R^{16}$—O—$R^{17}$—, —$R^{16}$—NH—$R^{17}$—, —$R^{16}$—C(=O)O—$R^{17}$—, —$R^{16}$—C(=O)O—NH—$R^{17}$—, —$R^{16}$—CO—$R^{17}$— or —$R^{16}$—CO—NH—$R^{17}$—, where $R^{15}$ represents a linear or branched C1 to C7 alkylene group, $R^{16}$ represents a linear or branched C1 to C3 alkylene group and $R^{17}$ represents a linear or branched C1 to C5 alkylene group).

The above polymer compound can be suitably realized as a result.

In one preferred embodiment, a proportion of the polymer compound is 2 mass % or higher, with respect to 100 mass % as an entirety of the electrode mixture layer. This allows better increasing liquid retention in the electrode mixture layer, and bringing out the effect of the technology disclosed herein at a yet higher degree.

In one preferred aspect, the supporting salt contains lithium bis(fluorosulfonyl)imide. Battery resistance can be kept yet lower as a result.

In one preferred embodiment, the binder further contains at least one of a fluororesin and a rubber. This allows better enhancing the integrity between the collector and the electrode mixture layer, and/or the maintainability of the shape of the electrode mixture layer.

DETAILED DESCRIPTION OF THE PREFERRED EMBODIMENTS

Embodiments of the present invention will be explained below with reference to accompanying drawings, as appropriate. Any features other than the matter specifically set forth in the present specification and that may be necessary for carrying out the present invention can be regarded as instances of design matter, for a person skilled in the art, based on known techniques in the relevant technical field. The present invention can be realized on the basis of the disclosure of the present specification and common technical knowledge in the relevant technical field. In the drawings below, members and portions that elicit identical effects are denoted with identical reference symbols, and a recurrent explanation thereof will be omitted or simplified. The dimensional relationships (length, width, thickness and so forth) in the figures do not necessarily reflect actual dimensional relationships.

Nonaqueous Secondary Battery

Figure 1:
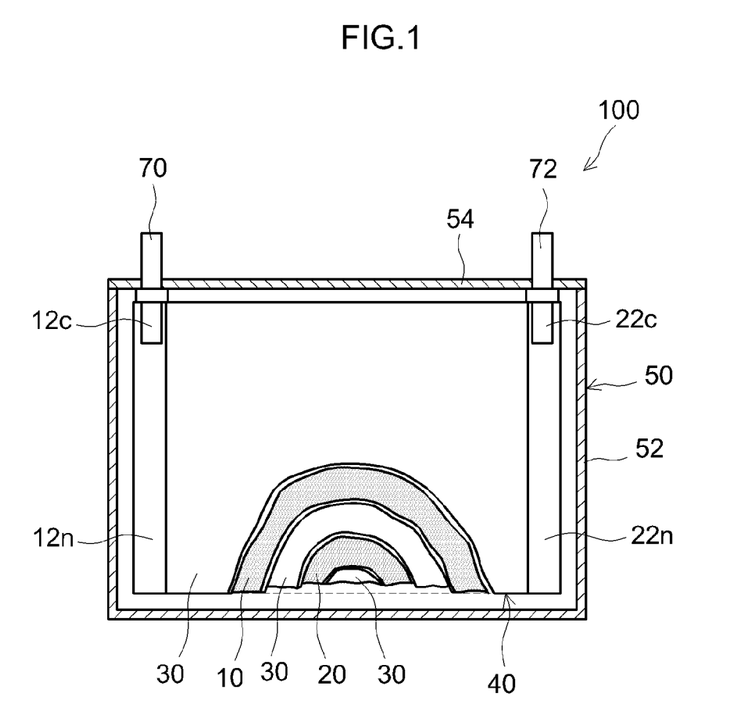
FIG. 1 is a longitudinal cross-sectional diagram illustrating schematically a nonaqueous secondary battery according to an embodiment.

FIG. 1 is a longitudinal cross-sectional diagram illustrating schematically the internal structure of a nonaqueous secondary battery 100. The nonaqueous secondary battery 100 is configured by an electrode body 40 being accommodated in a battery case 50 together with a nonaqueous electrolyte solution, not shown.

The battery case 50 is provided with a flat rectangular parallelepiped shape (box shape) battery case body 52 having an open top end, and with a lid plate 54 that plugs the opening of the battery case body 52. The material of the battery case 50 is not particularly limited. The material of the battery case 50 is for instance a lightweight metal such as aluminum. The outer shape of the battery case 50 is herein a rectangular parallelepiped shape, but may also be for instance a cylindrical shape, a coin shape or the like. The battery case 50 may have a bag-like shape made of a laminate film. A positive electrode terminal 70 and a negative electrode terminal 72 for external connection protrude from the lid plate 54. An injection hole, not shown, is provided in the lid plate 54.

The electrode body 40 is a wound electrode body. The electrode body 40 is provided with a band-like positive electrode 10, a band-like negative electrode 20 and a band-like separator 30. The electrode body 40 is configured through winding, in the longitudinal direction, of a stack of the positive electrode 10 and the negative electrode 20 superimposed on each other across the separator 30. The outer shape of the electrode body 40 is a flat shape. The electrode body 40 has a substantially rounded rectangular shape in a cross-section perpendicular to the winding axis. The electrode body 40 may be a plate-like multilayer electrode body configured by laying up a rectangular positive electrode and a rectangular negative electrode via a rectangular separator.

The positive electrode 10 is provided with a band-like positive electrode collector and with a positive electrode mixture layer fixed to the surface of the positive electrode collector. A conductive member made up of a metal of good conductivity (for instance aluminum) is preferred as the positive electrode collector. The positive electrode mixture layer is formed along the longitudinal direction of the positive electrode collector, at the surface of the positive electrode collector. A positive electrode mixture layer non-forming portion 12$n$, on which the positive electrode mixture layer is not formed, is provided at one edge (left side in FIG. 1) in the width direction of the positive electrode collector. The positive electrode 10 is electrically connected to the positive electrode terminal 70 via a positive electrode power collector plate 12c that is attached to the positive electrode mixture layer non-forming portion 12n.

The positive electrode mixture layer contains at least a positive electrode active material and a positive electrode binder. One or two or more active materials of various types that can be used in positive electrodes of nonaqueous secondary batteries can also be utilized herein, without particular limitations, as the positive electrode active material. Preferred examples include for instance lithium-transition metal complex oxides such as lithium-nickel-manganese complex oxides, lithium-nickel-manganese-cobalt complex oxides and the like.

In the present embodiment, the positive electrode binder has a first function of fixing the positive electrode mixture layer on the positive electrode collector, a second function of maintaining the shape of the positive electrode mixture layer, and, in addition, a third function of holding a nonaqueous electrolyte solution within the positive electrode mixture layer. The positive electrode binder contains a network polymer compound. The polymer compound has a structure a resulting from urethane-bonding of four-branch prepolymers having a polyethylene glycol backbone. Accordingly, the polymer compound may be abbreviated hereafter as "Tetra-PEG binder". The Tetra-PEG binder will be described in detail further on. The positive electrode binder may be made up of the Tetra-PEG binder alone, or may include, besides the Tetra-PEG binder, also one or two or more binders of various kinds known to be usable in nonaqueous secondary batteries. Preferred examples of such binders include for instance fluororesins such as polyvinylidene fluoride (PVdF), polytetrafluoroethylene (PTFE) and the like, as well as polyalkylene oxides such as polyethylene oxide (PEO) and the like. Among the foregoing PTFE can be preferably used, for instance on account of its low solubility in DMF.

As the positive electrode binder there is preferably used the Tetra-PEG binder concomitantly with another binder, from the viewpoint of bringing out the first and second functions at a high degree. A preferred example includes combinations of the Tetra-PEG binder and a fluororesin (for instance PTFE). The content ratio of the Tetra-PEG binder and the fluororesin may be for instance set to Tetra-PEG binder:fluororesin=1:2 to 2:1.

The positive electrode mixture layer may include components other than the positive electrode active material and the positive electrode binder, for instance various additives such as conductive materials. Examples of conductive materials include for instance carbon black such as acetylene black, Ketjen black and the like, and carbonaceous materials such as activated carbon, graphite and the like.

The proportion of the positive electrode active material is not particularly limited, but may be about 50 mass % or more, typically 80 mass % or more, preferably 90 mass % or more, and about 98 mass % or less, typically 95 mass % or less, with respect to 100 mass % as the entirety of the positive electrode mixture layer, for instance in terms of realizing high energy density.

The proportion of the positive electrode binder is not particularly limited, but may be about 1 mass % or more, typically 3 mass % or more, and for instance 5 mass % or more, and about 10 mass % or less, and typically 8 mass % or less, with respect to 100 mass % as the entirety of the positive electrode mixture layer, from the viewpoint of yet better balancing the first to third functions. The proportion of the Tetra-PEG binder is not particularly limited, but may be about 1 mass % or more, preferably 2 mass % or more, and about 10 mass % or less, for instance 5 mass % or less, with respect to 100 mass % as the entirety of the positive electrode mixture layer, from the viewpoint of yet better balancing the first to third functions.

The negative electrode 20 is provided with a band-like negative electrode collector, and with a negative electrode mixture layer fixed to the surface of the negative electrode collector. A conductive material made up of a metal of good conductivity (for instance copper) is preferred as the negative electrode collector. The negative electrode mixture layer is formed along the longitudinal direction of the negative electrode collector, at the surface of the negative electrode collector. A negative electrode mixture layer non-forming portion 22n, on which the negative electrode mixture layer is not formed, is provided at one edge (right side in FIG. 1) in the width direction of the negative electrode collector. The negative electrode 20 is electrically connected to the negative electrode terminal 72 via a negative electrode power collector plate 22c that is attached to the negative electrode mixture layer non-forming portion 22n.

The negative electrode mixture layer contains at least a negative electrode active material and a negative electrode binder.

One or two or more active materials of various types that can be used in negative electrodes of nonaqueous secondary batteries can also be utilized herein, without particular limitations, as the negative electrode active material. Preferred examples include for instance graphitic carbon such as natural graphite, artificial graphite, amorphous coated graphite and the like. The term "graphitic carbon" in the present invention denotes a carbon material having a proportion of graphite of about 50 mass % or higher, typically 80 mass % or higher.

In the present embodiment, the negative electrode binder has a first function of fixing the negative electrode mixture layer on the negative electrode collector, a second function of maintaining the shape of the negative electrode mixture layer, and, in addition, a third function of holding a nonaqueous electrolyte solution within the negative electrode mixture layer. The negative electrode binder contains the Tetra-PEG binder. The Tetra-PEG binder will be described in detail further on. The negative electrode binder may be made up of the Tetra-PEG binder alone or may include, in addition to the Tetra-PEG binder, one or two or more binders of various kinds known to be usable in nonaqueous secondary batteries. Preferred examples of the such binders include for instance rubbers such as styrene butadiene rubber (SBR), acrylonitrile-butadiene copolymer rubber (NBR), acrylonitrile-butadiene-isoprene copolymer rubber (NBIR) and the like, and fluororesins such as polyvinylidene fluoride (PVdF), polytetrafluoroethylene (PTFE) and the like. Among the foregoing there can be suitably used a rubber, for instance a diene rubber having double bonds in a main chain, preferably a butadiene rubber in which butadiene takes up 50 mol % or more of the whole, on account for instance of the low solubility of rubbers in DMF.

As the negative electrode binder there is preferably used the Tetra-PEG binder concomitantly with another binder, from the viewpoint of bringing out the first and second functions at a high degree. Preferred examples include for instance combinations of the Tetra-PEG binder and a rubber (for instance a butadiene rubber). In a content ratio of the Tetra-PEG binder and the rubber, the proportion of the Tetra-PEG binder is typically higher than that of the rubber; for instance, there may be set herein Tetra-PEG binder:rubber=2:1 to 20:1.

The negative electrode mixture layer may contain components other than the negative electrode active material and the negative electrode binder, for instance various additives such as thickeners, dispersants, conductive materials and the like. Examples of thickeners include for instance cellulose such as carboxymethyl cellulose (CMC), methyl cellulose (MC) and the like. For instance, an amorphous carbon material such as carbon black, activated carbon or the like can be used as the conductive material.

The proportion of the negative electrode active material is not particularly limited, but may be about 50 mass % or more, typically 80 mass % or more, preferably 90 mass % or more, and about 99 mass % or less, typically 98 mass % or less, with respect to 100 mass % as the entirety of the negative electrode mixture layer, for instance in terms of realizing high energy density.

The proportion of the negative electrode binder is not particularly limited, but may be about 0.5 mass % or more, typically 1 mass % or more, and for instance 2 mass % or more, and about 10 mass % or less, and typically 6 mass % or less, with respect to 100 mass % as the entirety of the negative electrode mixture layer, from the viewpoint of yet better balancing the first to third functions. The proportion of the Tetra-PEG binder is not particularly limited, but may be about 1 mass % or more, preferably 2 mass % or more, and about 10 mass % or less, for instance 5 mass % or less, with respect to 100 mass % as the entirety of the negative electrode mixture layer, from the viewpoint of yet better balancing the first to third functions. The proportion of the Tetra-PEG binder in the negative electrode mixture layer may be identical to or differ from the proportion of the Tetra-PEG binder in the positive electrode mixture layer.

The separator 30 is disposed between the positive electrode mixture layer of the positive electrode 10 and the negative electrode mixture layer of the negative electrode 20. The separator 30 is a band-like resin sheet. Examples of resin sheets include porous sheets made up of a resin, for instance a polyolefin such as polyethylene (PE), polypropylene (PP) or the like, or a polyester, a polyamide or the like. The separator 30 may be a single-layer structure or may be a multilayer structure being a stack of two or more resin sheets of dissimilar materials and/or properties (thickness, porosity and so forth). The separator 30 may be provided with a heat-resistant layer (HRL layer) on the surface.

The nonaqueous electrolyte solution contains a nonaqueous solvent and a supporting salt. The nonaqueous electrolyte solution is typically liquid within the range of use of a nonaqueous secondary battery 100 (typically within a temperature range of −20° C. to +60° C., for instance a temperature range of −10° C. to 50° C.). The viscosity of the nonaqueous electrolyte solution (viscosity measured using a B-type rotation viscometer at 25° C.) may be for instance 10 mPa·s or less, preferably 5 mPa·s or less, from the viewpoint of achieving yet higher ionic conductivity.

The nonaqueous solvent contains N,N-dimethylformamide (DMF). The nonaqueous solvent may be made up of DMF alone, but may typically contain one or two or more nonaqueous solvents of various types known to be usable in nonaqueous secondary batteries, at a volume fraction lower than that of DMF. Preferred examples of such nonaqueous solvents include for instance carbonates, esters, ethers, nitriles, sulfones, lactones and the like. Examples of carbonates include for instance ethylene carbonate (EC), diethyl carbonate (DEC), dimethyl carbonate (DMC), ethyl methyl carbonate (EMC) and the like.

The supporting salt generates charge carrier ions through dissociation in the nonaqueous solvent. Examples of the supporting salt include for instance lithium salts and sodium salts. Preferred examples of lithium salts include for instance lithium bis(fluorosulfonyl)imide (LiFSI), $LiPF_6$, $LiBF_4$ and the like. Among the foregoing, LiFSI is preferably used from the viewpoint of further increasing the ionic conductivity of the nonaqueous electrolyte solution. In the present embodiment the concentration of the supporting salt is 1 to 2 mol/L, preferably 1 to 1.5 mol/L. As a result, it becomes possible to increase ionic conductivity by suppressing excessive increases in the viscosity of the nonaqueous electrolyte solution. Battery resistance can be yet better reduced as a result.

Figure 2:
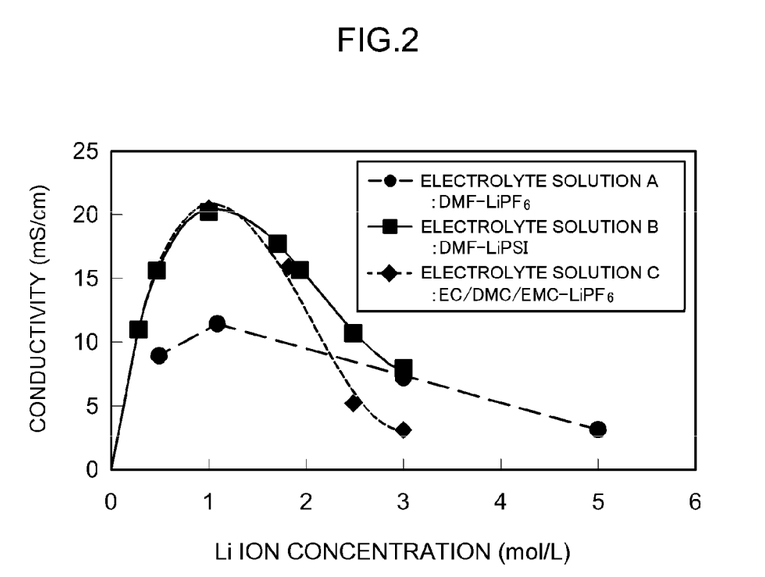
FIG. 2 is a graph illustrating a relationship between Li ion concentration and conductivity.

FIG. 2 illustrates a relationship between Li ion concentration and conductivity for three types of nonaqueous electrolyte solutions (electrolyte solutions A to C). Herein electrolyte solution A is an electrolyte solution containing $LiPF_6$ (supporting salt) in DMF (nonaqueous solvent). Electrolyte solution B is an electrolyte solution containing LiFSI (supporting salt) in DMF (nonaqueous solvent). Electrolyte solution C is an electrolyte solution containing $LiPF_6$ (supporting salt) in a mixed solvent of EC, DMC and EMC. As illustrated in FIG. 2, electrolyte solutions A and B, having DMF as the nonaqueous solvent, exhibit relatively higher conductivity than electrolyte solution C, where the nonaqueous solvent is carbonates. In the case for instance where the Li ion concentration is 1.1 mol/L, the conductivity of electrolyte solutions A and B is about twice that of electrolyte solution C. Further, the change in conductivity with respect to a change in Li ion concentration is smaller in electrolyte solutions A and B than in electrolyte solution C.

From the above it follows that battery resistance can be yet better reduced in a nonaqueous secondary battery 100 containing DMF as the nonaqueous solvent and in which the concentration of the supporting salt is 1 to 2 mol/L. Moreover, superior high-rate tolerance can also be achieved.

Tetra-PEG Binder

An explanation follows next on a Tetra-PEG binder that is contained in the positive electrode mixture layer of the positive electrode 10 and in the negative electrode mixture layer of the negative electrode 20. The Tetra-PEG binder has a structure resulting from crosslinking, by way of urethane bonds (—O—C(═O)—NH—), of four-branch prepolymers having a polyethylene glycol backbone. The Tetra-PEG binder is a polymer compound having a network structure. The Tetra-PEG binder is typically a so-called gel. The Tetra-PEG binder is highly hydrophilic (oil-repellent), with suppressed solubility in DMF. The shape of the positive electrode 10 and of the negative electrode 20 can be maintained stably as a result.

The Tetra-PEG binder has urethane bonds of large charge bias. The charge bias of the Tetra-PEG binder is for instance larger than that of amide bonds (—C(═O)—N—). Accordingly, the Tetra-PEG binder exhibits a stronger capturing force, in terms of attracting charge carrier ions, than polymer compounds having amide bonds, for instance those disclosed in Japanese Patent Application Publication No. 2016-170992. As a result, the concentration of charge carrier ions at the interface between the electrode mixture layer and the nonaqueous electrolyte solution can be better increased, and interface resistance can be reduced to a high degree. The Tetra-PEG binder allows increasing also the liquid retention of the electrode mixture layer. Therefore the nonaqueous electrolyte solution can be better maintained in the electrode mixture layer even when the positive electrode 10 and the negative electrode 20 expand and contract significantly, for instance accompanying high-rate charging and discharging. As a result, it becomes possible to suppress the occurrence of so-called dry-out while increasing high-rate tolerance.

In one preferred embodiment the Tetra-PEG binder has a structure resulting from urethane-bonding two four-branch carbon atoms by way of the following bonds: —[CH$_2$—O—(CH$_2$CH$_2$O)$_{n1}$—R$^1$]—O—C(=O)—NH—[R$^2$—(OCH$_2$CH$_2$)$_{n2}$—O—CH$_2$]—. The Tetra-PEG binder has for instance the following structural moiety: C—[CH$_2$—O—(CH$_2$CH$_2$O)$_{n1}$—R$^1$—O—C(=O)—NH]$_4$.

The above $n_1$ and $n_2$ are each independently an integer equal to or greater than 3. Studies by the inventors have revealed that by virtue of the above configuration the distance between two four-branch carbon atoms (C—C distance) can be made larger than that of a solvated charge carrier ion trimer. Permeability towards charge carrier ions can be enhanced as a result. Herein $n_1$ and $n_2$ may be typically 10 or greater, for instance 20 or greater, from the viewpoint of increasing permeability towards charge carrier ions. Further, $n_1$ and $n_2$ may be about 300 or smaller, typically 200 or smaller and for instance 100 or smaller, from the viewpoint of better increasing the toughness of the network structure. Further, $n_1$ and $n_2$ may be roughly identical (difference between $n_1$ and $n_2$ no greater than 5), in terms of increasing the homogeneity of the network structure. More preferably, $n_1$ and $n_2$ may be identical.

The above R$^1$ and R$^2$ are each independently a linear or branched alkylene group having 1 to 7 (for instance 1 to 4) carbon atoms, a linear or branched alkenylene group having 2 to 7 (for instance 2 to 4) carbon atoms, —NH—R$^{15}$—, —CO—$^{15}$—, —R$^{16}$—O—R$^{17}$—, —R$^{16}$—NH—R$^{17}$—, —R$^{16}$—C(=O)O—R$^{17}$—, —R$^{16}$—C(=O)O—NH—R$^{17}$, —R$^{16}$CO—R$^{17}$— or —R$^{16}$—CO—NH—R$^{17}$—. Herein, R$^{15}$ represents a linear or branched C1 to C7 alkylene group, R$^{16}$ represents a linear or branched C1 to C3 alkylene group and R$^{17}$ represents a linear or branched C1 to C5 alkylene group.

Concrete examples of alkylene groups include for instance methylene groups, ethylene groups, propylene groups and butylene groups. Herein R$^1$ and R$^2$ may be identical from the viewpoint of increasing the homogeneity of the network structure. Further, all of R$^1$ and R$^2$ may be linear, in terms of increasing permeability towards charge carrier ions.

The Tetra-PEG binder is for instance a copolymer resulting from bonding, via urethane bonds, in a reaction between a first polymer (Tetra-PEG-OH) represented by chemical formula (I) below and a second polymer (Tetra-PEG-N=C=O) represented by chemical formula (II) below, for instance at a molar ratio of 1:0.8 to 1:1.2:

[C3]

(in chemical formula (I), $n_{11}$ to $n_{14}$ are each independently an integer equal to or greater than 3, and R$^{11}$ to R$^{14}$ are each independently identical to the above R$^1$ and R$^2$);

[C4]

(in chemical formula (II), $n_{21}$ to $n_{24}$ are each independently an integer equal to or greater than 3, and R$^{21}$ to R$^{24}$ are each independently identical to the above R$^1$ and R$^2$).

The copolymer can be formed through reaction of the first polymer and the second polymer for instance in the co-presence of the nonaqueous electrolyte solution.

From the viewpoint of increasing the homogeneity and toughness of the network structure, $n_{11}$ to $n_{14}$ in chemical formula (I) may be substantially identical (for instance, maximum difference between $n_{11}$ and $n_{14}$ no greater than 5), and more preferably $n_{11}$ to $n_{14}$ may be identical. Further, R$^{11}$ to R$^{14}$ in chemical formula (I) may be identical, from the viewpoint of increasing the homogeneity of the network structure. Further, all of R$^{11}$ and R$^{14}$ may be linear, in terms of increasing permeability towards charge carrier ions.

From the viewpoint of increasing the homogeneity and toughness of the network structure, $n_{21}$ to $n_{24}$ in chemical formula (II) may be substantially identical (for instance, maximum difference between $n_{21}$ to $n_{24}$ no greater than 5), and more preferably $n_{21}$ to $n_{24}$ may be identical. Further, R$^{21}$ to R$^{24}$ in chemical formula (II) may be identical, from the viewpoint of increasing the homogeneity of the network structure. Further, all of R$^{21}$ to R$^{24}$ may be linear, in terms of increasing permeability towards charge carrier ions.

High conductivity can be realized in the nonaqueous secondary battery 100 of the present embodiment by virtue of the fact that the nonaqueous electrolyte solution contains DMF. Further, dissolution of the binder can be suppressed, and the shape of the positive electrode 10 and of the negative electrode 20 can thereby be maintained stably, by virtue of the fact that the positive electrode 10 and the negative electrode 20 contain the Tetra-PEG binder. Moreover, the presence of the Tetra-PEG binder in the positive electrode 10 and in the negative electrode 20 allows increasing liquid retention in the positive electrode 10 and the negative electrode 20. As a result, the nonaqueous electrolyte solution can be maintained stably inside the electrode body 40 even when the positive electrode 10 and/or the negative electrode 20 expand and contract significantly, for instance accompanying high-rate charging and discharging. That is, it becomes possible to suppress outflow of the nonaqueous electrolyte solution from the electrode body 40. Together, these effects allow keeping battery resistance low, while increasing high-rate tolerance, in the nonaqueous secondary battery 100.

The nonaqueous secondary battery 100 is superior to conventional batteries as regards input-output characteristics and high-rate tolerance. Accordingly, illustrative preferred uses of the technology disclosed herein include for instance nonaqueous secondary batteries that are repeatedly charged and discharged at a high rate, of about 2 C or higher, typically 5 C or higher, and further 10 C or higher, for instance at 10 to 50 C. The "C rate" denotes herein a ratio of current value (A) with respect to the theoretical capacity (Ah) of the battery.

The nonaqueous secondary battery 100 can be used in various applications, but may be preferably utilized, by exploiting the above properties, for instance as a driving power source installed in vehicles. The type of vehicle is not particularly limited, and includes for instance plug-in hybrid vehicles (PHV), hybrid vehicles (HV), electric vehicles (EV), electric trucks, electric scooters, electric assisted bicycles, electric wheelchairs, electric trains and the like.

Several examples pertaining to the present invention will be described below, but the invention is not intended to be limited to such concrete examples.

Construction of Nonaqueous Secondary Battery

Reference Example 1

Firstly, a lithium-nickel-manganese-cobalt complex oxide as a positive electrode active material, acetylene black as a conductive material and polyvinylidene fluoride (PVdF) as a binder were mixed, and were kneaded while viscosity was adjusted with N-methyl pyrrolidone (NMP), to prepare a positive electrode slurry. The proportion of PVdF with respect to total solids was set to the proportion (3.0 mass %) given in Table 1. The positive electrode slurry was applied onto an aluminum foil (positive electrode collector), was dried, and thereafter the whole was rolled to produce as a result a positive electrode having a positive electrode mixture layer on the positive electrode collector.

Next, amorphous coated graphite (C) as a negative electrode active material, styrene butadiene rubber (SBR) as a binder and carboxymethyl cellulose (CMC) as a dispersant were mixed, and were kneaded while viscosity was adjusted using deionized water, to prepare a negative electrode slurry. The proportion of SBR with respect to total solids was set to the proportion (0.5 mass %) given in Table 1. The negative electrode slurry was applied onto a copper foil (negative electrode collector), was dried, and thereafter the whole was rolled to produce as a result a negative electrode having a negative electrode mixture layer on the negative electrode collector.

The positive electrode and the negative electrode thus produced were arranged opposing each other, across an interposed separator, to produce an electrode body. The separator used herein had a three-layer structure resulting from overlaying polypropylene (PP) on both faces of polyethylene (PE).

Next, LiPF$_6$ as a supporting salt was dissolved, to a concentration of 1.0 mol/L, in a mixed solvent that contained ethylene carbonate (EC), dimethyl carbonate (DMC) and ethyl methyl carbonate (EMC) at a volume ratio of EC:DMC:EMC=30:40:30, to prepare a nonaqueous electrolyte solution.

The electrode body was accommodated in a battery case, and was vacuum-dried at 100° C. After vacuum drying, an opening of the battery case and a lid plate were welded, and the whole was confined at a pressure of 1.1 t from the layering direction of the electrode body. The above nonaqueous electrolyte solution was next injected through an injection hole provided in the lid plate of the battery case. A lithium ion secondary battery (Reference Example 1) was thus constructed in this manner.

Reference Example 2

A lithium ion secondary battery (Reference Example 2) was constructed in the same way as in Reference Example 1, but herein N,N-dimethylformamide (DMF) was used as the nonaqueous solvent in the preparation of the nonaqueous electrolyte solution.

Reference Example 3

Herein polytetrafluoroethylene (PTFE) and a copolymer of polyvinylidene fluoride and hexafluoropropylene (PVdF-HFP) were used in the proportions given in Table 1, as the binder in the production of the above positive electrode. Further, SBR and PVdF-HFP were used in the proportions given in Table 1, as the binder, to produce a negative electrode. Otherwise, a lithium ion secondary battery (Reference Example 3) was constructed in the same way as in Reference Example 2.

Reference Example 4

Polytetrafluoroethylene (PTFE) and polyacrylonitrile (PAN) were used in the proportions given in Table 1, as the binder, to produce a positive electrode. Further, SBR and PAN were used in the proportions given in Table 1, as the binder, to produce a negative electrode. Otherwise, a lithium ion secondary battery (Reference Example 4) was constructed in the same way as in Reference Example 2.

Example 1

Herein polytetrafluoroethylene (PTFE) and a Tetra-PEG binder (Tetra-PEG-urethane-bonded) having urethane bonds were used in the proportions given in Table 1 as the binder, to produce a positive electrode. Specifically, Tetra-PEG-OH and Tetra-PEG-N=C=O were incorporated into the positive electrode to a molar ratio of 1:1, and the nonaqueous electrolyte solution was injected into the battery case, to thereby swell the polymer backbone of Tetra-PEG and yield the Tetra-PEG binder (Tetra-PEG-urethane-bonded). Further, SBR and the Tetra-PEG binder (Tetra-PEG-urethane-bonded) were used in the proportions given in Table 1, as the binder, to produce a negative electrode. Otherwise, a lithium ion secondary battery (Example 1) was constructed in the same way as in Reference Example 2.

Example 2

A lithium ion secondary battery (Example 2) was constructed in the same way as in Example 1, but dissolving herein LiPF$_6$ to a concentration of 2.0 mol/L in the preparation of the nonaqueous electrolyte solution.

Reference Example 5

Herein a lithium ion secondary battery (Reference Example 5) was constructed in the same way as in Example 2, but herein there were incorporated Tetra-PEG-NH$_2$ and Tetra-PEG-NHS (hydroxysuccinimidyl), to produce a positive electrode and a negative electrode, and the nonaqueous electrolyte solution was injected into the battery case, to thereby yield a Tetra-PEG binder (Tetra-PEG-amide bonded) having amide bonds.

Reference Examples 6 to 8

Lithium ion secondary batteries (Reference Examples 6 to 8) were produced in the same way as in Reference Example 2 but using herein PTFE as the binder in the proportions given in Table 1, to produce a positive electrode, and by dissolving LiPF$_6$ to the concentrations given in Table 1, in the preparation of the nonaqueous electrolyte solution.

Examples 3 and 4

Lithium ion secondary batteries (Examples 3 and 4) were constructed in the same way as in Examples 1 and 2, but using herein LiFSI as the supporting salt in the preparation of the nonaqueous electrolyte solution.

Example 5

A lithium ion secondary battery (Example 5) was constructed in the same way as in Example 4, but using herein the Tetra-PEG binder (Tetra-PEG-urethane-bonded) in the proportion given in Table 1, to produce a positive electrode and a negative electrode.

Reference Examples 9 and 10

Lithium ion secondary batteries (Reference Examples 9 and 10) were constructed in the same way as in Reference Examples 7 and 8, but using herein LiFSI as the supporting salt in the preparation of the nonaqueous electrolyte solution.

Measurement of Conductivity

A commercially available conductivity meter was used to measure the conductivity (mS/cm) in an environment at 25° C. of the binders (in a gel state containing the nonaqueous electrolyte solution) of the examples. Results are given in Table 1.

Activation Treatment

The batteries thus constructed were subjected to an activation treatment. Specifically, each battery was charged at constant current up to a voltage of 4.1 V at a charging rate of ⅓C in an environment at 25° C., after which the battery was charged at constant voltage up to a charging rate of 2/100C (conditioning treatment). The battery having undergone the above conditioning treatment was allowed to stand for 24 hours in a thermostatic bath at a temperature of 60° C. (aging treatment).

Measurement of Initial Resistance

Next, IV resistance was measured in an environment at 25° C. and at 0° C. Specifically, the state of charge (SOC) of the battery was adjusted to 50% in an environment at 25° C., and thereafter the battery was allowed to stand for 3 hours in a thermostatic bath at 25° C. or 0° C. After verifying that the surface temperature of the battery was 0±0.5° C., the battery was discharged for 5 seconds at a discharge rate of 10 C, and voltage drop was measured. The voltage drop was divided by the value of discharge current, to thereby calculate initial IV resistance (mΩ). Results are given in Table 1.

Measurement of High-rate Tolerance (Resistance Increase Rate)

High-rate tolerance was evaluated next in an environment at 25° C. Specifically, the SOC of each battery was adjusted to 20%, and thereafter an operation of charging for 1 second at a charging rate of 5 C and an operation of discharging for 5 seconds at a discharge rate of 1 C were repeated over 500 cycles. Thereafter IV resistance was measured in the same way as the initial resistance. Results where the resistance increase with respect to the initial resistance (25° C.) was lower than 10% were rated as good "O", whereas results where the increase in resistance with respect to the initial resistance was 10% or higher were rated as poor "X". Results are given in Table 1.

TABLE 1

| | Nonaqueous electrolyte solution | | | | | | Positive electrode | | | |
| --- | --- | --- | --- | --- | --- | --- | --- | --- | --- | --- |
| | Supporting salt | | Nonaqueous solvent | | | | Binder (1) | | Binder (2) | |
| | Type | Concentration mol/L | EC | DMC | EMC vol % | DMF | Type | Proportion mass % | Type | Proportion mass % |
| Ref. ex. 1 | LiPF$_6$ | 1.0 | 30 | 40 | 30 | 0 | PVdF | 3 | — | — |
| Ref. ex. 2 | | 1.0 | 0 | 0 | 0 | 100 | PVdF | 3 | — | — |
| Ref. ex. 3 | | 1.0 | 0 | 0 | 0 | 100 | PTFE | 3 | PVdF-HEP | 35 |
| Ref. ex. 4 | | 1.0 | 0 | 0 | 0 | 100 | PTFE | 3 | PAN | 25 |
| Ex. 1 | | 1.0 | 0 | 0 | 0 | 100 | PTFE | 3 | Tetra-PEG-urethane-bonded | 2 |
| Ex. 2 | | 2.0 | 0 | 0 | 0 | 100 | PTFE | 3 | Tetra-PEG-urethane-bonded | 2 |
| Ref. ex. 5 | | 2.0 | 0 | 0 | 0 | 100 | PTFE | 3 | Tetra-PEG-amide bonded | 2 |

TABLE 1-continued

| | | | | | | | | | | |
|---|---|---|---|---|---|---|---|---|---|---|
| Ref. ex. 6 | | 2.0 | 0 | 0 | 0 | 100 | PTFE | 3 | — | |
| Ref. ex. 7 | | 3.0 | 0 | 0 | 0 | 100 | PTFE | 3 | — | |
| Ref. ex. 8 | | 4.0 | 0 | 0 | 0 | 100 | PTFE | 3 | — | |
| Ex. 3 | LiFSI | 1.0 | 0 | 0 | 0 | 100 | PTFE | 3 | Tetra-PEG-urethane-bonded | 2 |
| Ex. 4 | | 2.0 | 0 | 0 | 0 | 100 | PTFE | 3 | Tetra-PEG-urethane-bonded | 2 |
| Ex. 5 | | 2.0 | 0 | 0 | 0 | 100 | PTFE | 3 | Tetra-PEG-urethane-bonded | 5 |
| Ref. ex. 9 | | 3.0 | 0 | 0 | 0 | 100 | PTFE | 3 | — | |
| Ref. ex. 10 | | 4.0 | 0 | 0 | 0 | 100 | PTFE | 3 | — | |

| | Negative electrode | | | | Battery performance | | | |
|---|---|---|---|---|---|---|---|---|
| | Binder (1) | | Binder (2) | | | IV resistance | | High-rate tolerance |
| | Type | Proportion mass % | Type | Proportion mass % | Conductivity mS/cm | 25° C. mΩ | 0° C. mΩ | |
| Ref. ex. 1 | SBR | 0.5 | — | — | 11 | 1.2 | 3.0 | ○ |
| Ref. ex. 2 | SBR | 0.5 | — | — | 20 | — | — | — |
| Ref. ex. 3 | SBR | 0.5 | PVdF-HFP | 35 | 7 | 1.4 | 4.6 | X |
| Ref. ex. 4 | SBR | 0.5 | PAN | 25 | 3 | 1.6 | 4.0 | X |
| Ex. 1 | SBR | 0.5 | Tetra-PEG-urethane-bonded | 2 | 18 | 0.8 | 3.2 | ○ |
| Ex. 2 | SBR | 0.5 | Tetra-PEG-urethane-bonded | 2 | 16 | 0.9 | 3.1 | ○ |
| Ref. ex. 5 | SBR | 0.5 | Tetra-PEG-amide bonded | 2 | 16 | 0.9 | 3.1 | X |
| Ref. ex. 6 | SBR | 0.5 | — | | 20 | 0.7 | — | — |
| Ref. ex. 7 | SBR | 0.5 | — | | 4 | 1.5 | — | — |
| Ref. ex. 8 | SBR | 0.5 | — | | 3 | 1.6 | — | — |
| Ex. 3 | SBR | 0.5 | Tetra-PEG-urethane-bonded | 2 | 19 | 0.8 | 3.0 | ○ |
| Ex. 4 | SBR | 0.5 | Tetra-PEG-urethane-bonded | 2 | 17 | 0.9 | 2.8 | ○ |
| Ex. 5 | SBR | 0.5 | Tetra-PEG-urethane-bonded | 5 | 12 | 1.2 | 3.3 | ○ |
| Ref. ex. 9 | SBR | 0.5 | — | | 7 | 1.4 | — | — |
| Ref. ex. 10 | SBR | 0.5 | — | | 5 | 1.5 | — | — |

Reference Example 1 is a test example in which the nonaqueous electrolyte solution contains no DMF. Results were assessed based on the evaluation results of the battery of Reference Example 1.

In Reference Example 2 the conductivity of the binder was higher than in Reference Example 1. The binder (PVdF) of the positive electrode, however, dissolved in DMF, and the shape of the positive electrode could not be maintained stably. In consequence battery performance could not be evaluated.

The conductivity of the binder was lower in both Reference Examples 3 and 4 than in Reference Example 1, and high-rate tolerance was likewise lower. A conceivable reason for this is that the proportion of binder is higher in Reference Examples 3 and 4, from the viewpoint of maintaining the shape of the electrode stably, which translates into higher resistance of the electrode mixture layer and lower liquid retention in the electrode mixture layer.

In Reference Example 5 there is used a Tetra-PEG binder (Tetra-PEG-amide bonded) having amide bonds. The conductivity of the binder was higher in Reference Example 5, but high rate characteristics poorer, than those in Reference Example 1. This is deemed to arise from the fact that liquid retention in the electrode mixture layer dropped during high-rate charging and discharging, on account of the weak $Li^+$ attracting force of amide bonds.

The IV resistance in Reference Examples 6 to 8 was so large, in a low-temperature environment, as to render measurement impossible. Moreover, high-rate tolerance was low. Binder conductivity was likewise low in Reference Examples 7 and 8. This can be ascribed to an increase in resistance brought about by a higher viscosity of the nonaqueous electrolyte solution.

In Examples 1 and 2, by contrast, the conductivity of the binder was higher, and the IV resistance of the batteries lower, than those in Reference Example 1. The batteries of Examples 1 and 2 exhibited also superior high-rate tolerance. These results bear out the technical significance of the technology disclosed herein.

Examples 3 to 5 and Reference Examples 9 and 10 are test examples in which LiFSI is used as the supporting salt, instead of $LiPF_6$. As Table 1 reveals, the same trends as those when $LiPF_6$ is used were observed also in a case where the type of supporting salt was different. Further, the conductivity of the electrode mixture layer could be better increased and the IV resistance lowered, at a yet higher degree, by using LiFSI as the supporting salt.

The present invention has been explained in detail above, but the embodiments and examples are merely illustrative in nature, and the invention disclosed herein encompasses various modifications and alterations of the above-described concrete examples.

In the above embodiments, for instance, the positive electrode is provided with a positive electrode collector and with a positive electrode mixture layer, and the negative electrode is provided with a negative electrode collector and with a negative electrode mixture layer. Further, both the positive electrode mixture layer and the negative electrode mixture layer are provided with a Tetra-PEG binder. However, the present invention is not limited thereto. For instance, the positive electrode or the negative electrode may lack a collector and an electrode mixture layer. Moreover, the positive electrode mixture layer or the negative electrode mixture layer may lack the Tetra-PEG binder. The positive electrode may be for instance a lithium foil or the like. The negative electrode may be for instance a carbon sheet or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A nonaqueous secondary battery, comprising:

a positive electrode;

a negative electrode; and a nonaqueous electrolyte solution, wherein the nonaqueous electrolyte solution contains a nonaqueous solvent and a supporting salt, the nonaqueous solvent contains N,N-dimethylformamide, a concentration of the supporting salt is 1 mol/L to 2 mol/L, at least one of the positive electrode and the negative electrode is provided with a collector, and an electrode mixture layer that is fixed to the collector and contains an active material and a binder, and the binder contains a network polymer compound with a structure resulting from urethane-bonding of four-branch prepolymers having a polyethylene glycol backbone.

2. The nonaqueous secondary battery according to claim 1, wherein the network polymer compound has a structure resulting from urethane-bonding of two types of prepolymers represented by chemical formulas (I) and (II):

[C1]

(in chemical formula (I), $n_{11}$ to $n_{14}$ are each independently an integer equal to or greater than 3, and $R^{11}$ to $R^{14}$ are each independently a linear or branched C1 to C7 alkylene group, a linear or branched C2 to C7 alkenylene group, $-NH-R^{15}-$, $-CO-R^{15}-$, $-R^{16}-O-R^{17}-$, $-R^{16}-NH-R^{17}-$, $-R^{16}-C(=O)O-R^{17}-$, $-R^{16}-C(=O)O-NH-R^{17}-$, $-R^{16}-CO-R^{17}-$ or $-R^{16}-CO-NH-R^{17}-$, where $R^{15}$ represents a linear or branched C1 to C7 alkylene group, $R^{16}$ represents a linear or branched C1 to C3 alkylene group and $R^{17}$ represents a linear or branched C1 to C5 alkylene group);

[C2]

(in chemical formula (II), $n_{21}$ to $n_{24}$ are each independently an integer equal to or greater than 3, and $R^{21}$ to $R^{24}$ are each independently a linear or branched C1 to C7 alkylene group, a linear or branched C2 to C7 alkenylene group, —NH—$R^{15}$—, —CO—$R^{15}$—, —$R^{16}$—O—$R^{17}$—, —$R^{16}$—NH—$R^{17}$—, —$R^{16}$—C(=O)O—$R^{17}$—, —$R^{16}$—C(=O)O—NH—$R^{17}$—, —$R^{16}$—CO—$R^{17}$— or —$R^{16}$—CO—NH—$R^{17}$—, where $R^{15}$ represents a linear or branched C1 to C7 alkylene group, $R^{16}$ represents a linear or branched C1 to C3 alkylene group and $R^{17}$ represents a linear or branched C1 to C5 alkylene group).

3. The nonaqueous secondary battery according to claim 1, wherein a proportion of the network polymer compound is 2 mass % or higher, with respect to 100 mass % as an entirety of the electrode mixture layer.

4. The nonaqueous secondary battery according to claim 1, wherein the supporting salt contains lithium bis(fluorosulfonyl)imide.

5. The nonaqueous secondary battery according to claim 1, wherein the binder further contains at least one of a fluororesin and a rubber.

* * * * *